(12) United States Patent
Winzell et al.

(10) Patent No.: US 12,548,292 B2
(45) Date of Patent: Feb. 10, 2026

(54) METHOD AND SYSTEM FOR IDENTIFYING REFLECTIONS IN THERMAL IMAGES

(71) Applicant: Axis AB, Lund (SE)

(72) Inventors: Thomas Winzell, Lund (SE); Song Yuan, Lund (SE)

(73) Assignee: AXIS AB, Lund (SE)

( * ) Notice: Subject to any disclaimer, the term of this patent is extended or adjusted under 35 U.S.C. 154(b) by 107 days.

(21) Appl. No.: 18/525,899

(22) Filed: Dec. 1, 2023

(65) Prior Publication Data

US 2024/0185559 A1    Jun. 6, 2024

(30) Foreign Application Priority Data

Dec. 5, 2022 (EP) .................................... 22211418

(51) Int. Cl.
*G06K 9/40* (2006.01)
*G01J 5/02* (2022.01)
(Continued)

(52) U.S. Cl.
CPC .............. *G06V 10/60* (2022.01); *G01J 5/025* (2013.01); *G01J 5/06* (2013.01); *G01J 5/48* (2013.01);
(Continued)

(58) Field of Classification Search
CPC .... G06T 5/00; G06T 5/50; G06T 7/00; G06T 7/10; G06T 7/11; G06T 7/12; G06T 7/13;
(Continued)

(56) References Cited

U.S. PATENT DOCUMENTS 10,129,490 B2    11/2018    Beall
2008/0056568 A1*    3/2008    Porikli ................. G06V 10/143
382/173
(Continued)

FOREIGN PATENT DOCUMENTS

CN    108775963 A    11/2018
EP    3115964 A    1/2017

OTHER PUBLICATIONS

Batchuluun et al., "A Study on the Elimination of Thermal Reflections", IEEE Access, vol. 7, Dec. 4, 2019, pp. 174597-174611.
(Continued)

*Primary Examiner* — Eric Rush
(74) *Attorney, Agent, or Firm* — XSENSUS LLP

(57) ABSTRACT

A method of detecting a reflection in a first thermal image captured by a thermal image sensor and, a second image is captured by a visible light sensor, near infrared sensor, or short-wave infrared sensor having a field of view which overlaps a field of view of the thermal image. A relationship between coordinates in the thermal image and the second image is determined. A first object is detected in a first position in the thermal image. A candidate image area in a second position in the second image is analysed to determine if an object equivalent to the first object is present, the second position corresponding to the first position according to the relationship between the coordinates in the thermal image and the second image. In response to a determination that there is no equivalent object in candidate image area, it is determined that first object is a reflection.

12 Claims, 9 Drawing Sheets

(51) Int. Cl.
| | |
|---|---|
| *G01J 5/06* | (2022.01) |
| *G01J 5/48* | (2022.01) |
| *G06T 7/50* | (2017.01) |
| *G06T 7/70* | (2017.01) |
| *G06V 10/143* | (2022.01) |
| *G06V 10/20* | (2022.01) |
| *G06V 10/54* | (2022.01) |
| *G06V 10/60* | (2022.01) |
| *G06V 10/74* | (2022.01) |
| *H04N 23/11* | (2023.01) |
| *H04N 23/23* | (2023.01) |
| *H04N 23/81* | (2023.01) |
| *G01J 5/00* | (2022.01) |

(52) U.S. Cl.
CPC ............... *G06T 7/50* (2017.01); *G06T 7/70* (2017.01); *G06V 10/143* (2022.01); *G06V 10/255* (2022.01); *G06V 10/54* (2022.01); *G06V 10/761* (2022.01); *H04N 23/11* (2023.01); *H04N 23/23* (2023.01); *H04N 23/81* (2023.01); *G01J 2005/0077* (2013.01); *G06T 2207/10048* (2013.01); *G06V 2201/07* (2022.01)

(58) Field of Classification Search
CPC ......... G06T 7/136; G06T 7/174; G06T 7/194; G06T 7/30; G06T 7/33; G06T 7/50; G06T 7/70; G06T 7/73; G06T 7/97; G06T 2207/10004; G06T 2207/10048; G06V 10/10; G06V 10/12; G06V 10/14; G06V 10/143; G06V 10/16; G06V 10/25; G06V 10/255; G06V 10/26; G06V 10/44; G06V 10/54; G06V 10/58; G06V 10/60; G06V 10/70; G06V 10/74; G06V 10/761; G06V 10/80; G06V 10/803; G06V 10/806; G06V 10/809; G06V 10/811; G06V 10/98; G06V 20/00; G06V 20/40; G06V 20/50; G06V 20/52; G06V 40/10; G06V 40/103; G06V 40/16; G06V 40/161; G06V 40/166; G06V 40/168; G06V 2201/07; H04N 23/10; H04N 23/11; H04N 23/13; H04N 23/20; H04N 23/23; H04N 23/45; H04N 23/81; G01J 5/00; G01J 5/0022; G01J 5/0025; G01J 5/025; G01J 5/06; G01J 5/48; G01J 5/52; G01J 2005/0077; G02B 27/0018
USPC ........ 382/100, 103, 107, 108, 110, 115, 117, 382/118, 154, 159, 162–165, 167, 382/170–173, 181, 190, 199, 218, 219, 382/224–227, 229, 254, 256, 260, 261, 382/274–276, 282, 283, 291, 302–304, 382/307–309, 312, 325; 348/61, 77, 122, 348/135, 139, 143, 152–154, 159, 161, 348/162, 164, 169–172; 250/330–334, 250/336.1, 338.1, 340, 342; 374/100, 374/101, 120, 121, 123, 124, 126, 210
See application file for complete search history.

(56) References Cited

U.S. PATENT DOCUMENTS

| | | | | |
|---|---|---|---|---|
| 2014/0368646 | A1* | 12/2014 | Traff | G06V 10/143 348/143 |
| 2016/0292826 | A1* | 10/2016 | Beall | G06T 7/33 |
| 2020/0082513 | A1* | 3/2020 | Winzell | G06T 5/40 |
| 2021/0027479 | A1* | 1/2021 | Price | G06T 7/97 |
| 2024/0177325 | A1* | 5/2024 | Katsuyama | G06T 7/30 |

OTHER PUBLICATIONS

Batchuluun et al., "Region-Based Removal of Thermal Reflection Using Pruned Fully Convolutional Network", IEEE Access, vol. 8, Apr. 20, 2020, pp. 75741-75760.
"Novelty Search" Uppdragshuset AB, Jun. 3, 2022, pp. 1-2.
Huo et al., "Glass Segmentation with RGB-Thermal Image Pairs", Journal of Latex Class Files, vol. 14, No. 8, Aug. 2021, pp. 1-13.

* cited by examiner

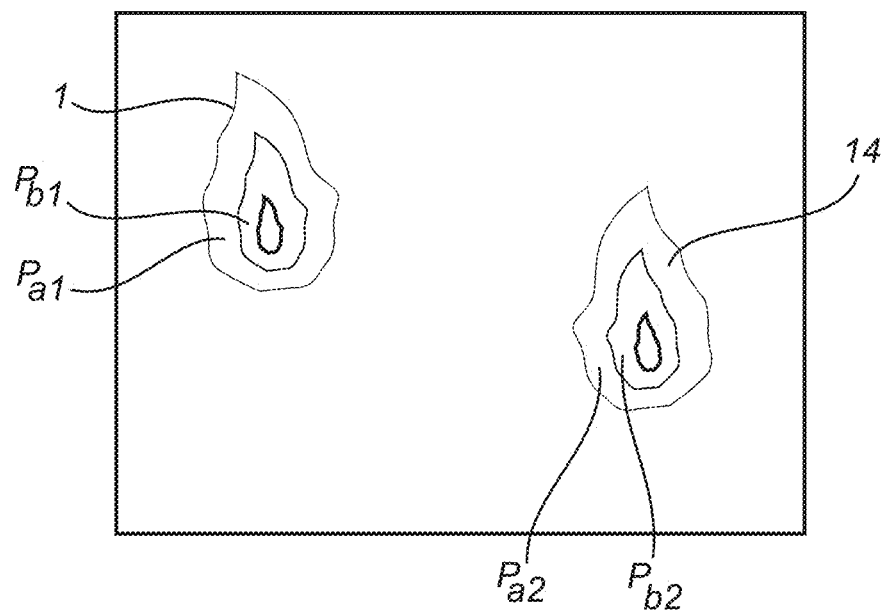
Fig. 13
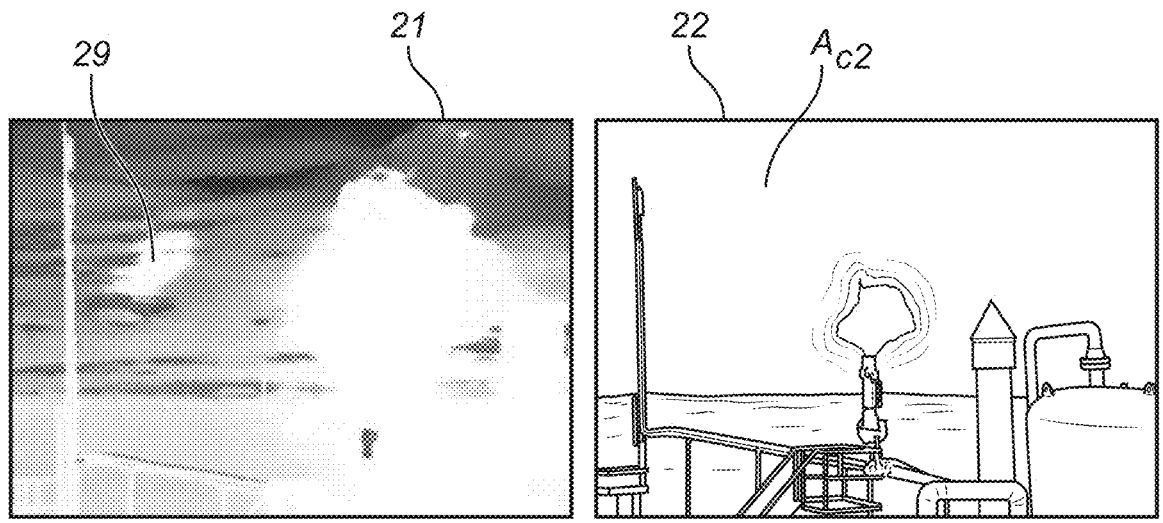
Fig. 14
Fig. 15

METHOD AND SYSTEM FOR IDENTIFYING REFLECTIONS IN THERMAL IMAGES

CROSS-REFERENCE TO RELATED APPLICATION

This application claims priority to European Patent Application No. 22211418.3, filed on Dec. 5, 2022, the entire disclosure of which is incorporated by reference herein.

TECHNICAL FIELD

The present invention relates to the field of thermal imaging and more particularly to the problem of reflections in thermal images.

BACKGROUND

Thermal cameras may be used for various monitoring applications, for security as well as for safety. As thermal cameras do not require visible light for capturing images, they are an attractive choice in low light scenarios, in which cameras using visible light may be less useful. Thermal cameras can also provide coverage of large areas in which objects of interest have an expected temperature that deviates from the surroundings. For this reason, thermal cameras are often used for security applications, such as perimeter surveillance. They may also make monitoring of areas possible where personal integrity is important, as thermal cameras enable detection of intruders without revealing the identity of people. For instance, thermal imagery may show that someone is moving in a school corridor at night without the surveillance threatening the privacy of students and teachers.

Thermal cameras are suitable for monitoring industries and infrastructure for safety reasons. For instance, they may be used for monitoring power generating facilities and substations to be able to sound an alarm if equipment is overheated. They may also be used for monitoring industrial processes in which there is a risk of self-ignition, and for monitoring fire hazards, such as garbage heaps and silos.

Many thermal camera systems rely on automated monitoring, using motion detection or temperature alarms. Thereby, imagery need not be continuously viewed by a human observer. However, there are also many thermal camera systems in which an operator monitors displayed thermal images in real time. Just like images from cameras employing visible light, thermal cameras suffer from reflections. Reflections may occur because of reflective surfaces in the monitored scene but they may also occur because of reflections within the camera itself. Regardless of the origin, such reflections may be annoying or confusing to a human viewer. They may also cause false detections in automated analytics algorithms. There is therefore a need for detecting reflections in thermal images, such that they may be removed from the images or otherwise compensated for.

A method of detecting reflections in thermal images is proposed by Batchuluun et al. in "A Study on the Elimination of Thermal Reflections" (IEEE Access, vol. 7, pp. 174597-174611). This proposed method is based on deep learning.

SUMMARY OF THE INVENTION

An object of the present invention is to provide a method for detecting reflections in thermal images. A further object is to provide a method for reflection detection that makes it possible to locate reflections in thermal images, such that they may be removed or compensated for. Another object is to provide a system and a thermal camera which enable detection of reflections in thermal images. Yet another object is to provide a system and a thermal camera which make it possible to locate reflections in such a way that they may be removed from or otherwise compensated for in thermal images.

The invention is defined by the appended claims.

According to a first aspect, the abovementioned objects are achieved, in full or at least in part, by a computer-implemented method of detecting a reflection in a first, thermal image captured by a thermal image sensor, the method comprising: capturing a second image by a visible light sensor, near infrared sensor, or short-wave infrared sensor having a field of view which overlaps a field of view of the thermal image, determining a mapping from coordinates in the thermal image to coordinates in the second image, detecting a first object in a first position in the thermal image, analysing a candidate image area in a second position in the second image to determine if an object equivalent to the first object is present in the candidate image area, the second position corresponding to the first position according to the relationship between the coordinates in the thermal image and the coordinates in the second image, and in response to a determination that there is no equivalent object in the candidate image area, determining that the first object is a reflection.

Near infrared radiation will in the following be referred to by the abbreviation NIR and short-wave infrared radiation will be referred to by the abbreviation SWIR.

A method such as the one defined in the first aspect of the invention provides a convenient way of detecting reflections in a thermal image and may be implemented using relatively inexpensive components. Adding a visible light camera, a NIR camera, or a SWIR camera to a thermal camera is generally much less expensive than adding a second thermal camera. Adding a second thermal camera, directed at the same area in the monitored scene but from another angle, could provide another way of detecting compensating for reflections.

The term equivalent object here signifies an object that is sufficiently similar to the first object. It is well known that objects do not look the same in a thermal image as in a visible light image, a NIR image, or a SWIR image. Thus, one and the same physical object in a captured scene will not look identical in the thermal image and the second image. However, the shape and size of an object in the thermal image may be expected to resemble the shape and size of an object in the second image if they represent the same physical object in the captured scene. The object in the second image will in such case be seen as equivalent to the first object. If a first object has been detected in the thermal image and no object is found in the corresponding position in the second image, it may be clearly appreciated that there is no object equivalent to the first object in the second image. It may also be appreciated that if an object is also found in the corresponding position in the second image, but that object differs significantly from what would be expected if the first object in the thermal image and the object in the second image were representing the same physical object in the scene, then the object found in the second image is not an object equivalent to the first object.

In some variants, analysing the candidate image area comprises comparing an appearance of the first object to an appearance of the candidate image area to determine if an object equivalent to the first object is present in the candidate image area, and in response to the appearance of the first object differing by more than a first threshold amount, it is determined that the first object is a reflection. The appearance of the candidate image area may in some images be such that no object is detected in the candidate image area. In other images, the appearance of the candidate image area may be such that an object is detected there. Such an object may or may not be similar enough to the first object to be determined to be an equivalent object.

According to a variant of the method, appearance is at least one from the group consisting of shape, texture, pattern, and contrast. Various methods of analysing such properties of images are well known in image processing, for thermal images as well as for visible light images, NIR images, and SWIR images.

Analysing the candidate image area may comprise analysing if an object is present in the candidate image area to determine if an object equivalent to the first object is present in the candidate image area, and in response to a determination that no object is present in the candidate image area it may be determined that the first object is a reflection. This provides an uncomplicated way of determining that the first object is a reflection. If an object detection algorithm is used which is capable of discerning object class, the method may comprise determining that the first object is a reflection in response to a determination that there is no object of the same class as the first object in the candidate image area. This would imply that there is no object at all in the candidate image area or that there is an object but of a different class than the first object.

According to some variants of the method, a further object is detected in a third position in the thermal image, and analysing the candidate image area comprises: detecting a corresponding object in a fourth position in the second image, the fourth position corresponding to the third position according to the relationship between the coordinates in the thermal image and the coordinates in the second image, comparing an appearance of the corresponding object to an appearance of the candidate image area to determine if the corresponding object is an object equivalent to the first object, the method further comprising, in response to the appearance of the corresponding object differing from the appearance of the candidate image area by more than a second threshold amount, determining that the first object or the further object is a reflection. and in response to the contrast value of the of the candidate image area exceeding the contrast value of the corresponding object by more than the second threshold amount, determining that the further object is a reflection. As used herein, the corresponding object is an object in the second image that corresponds to the further object detected in the thermal image. If the first object and the further object have been detected in the thermal image, one hypothesis that may be formed is that one of these represents an actual object in the scene and that the other is a reflection. By looking for a corresponding pair of objects in the second image, i.e. a possible object in the candidate image area and an object corresponding to the further object, a comparison may be made in the second image. If there is no object in the candidate image area, then only the further object had a correspondence in the second image and it may be deduced that the first object is a reflection. If an object is found also in the candidate image area, a comparison may be made between the two objects found in the second image. If they differ significantly from each other, it may be concluded that they do not represent two equal objects in the scene. From this, it may be deduced that one of the objects detected in the thermal image is a reflection. Studying the contrast of the candidate image area and the corresponding object provides a convenient way of making the comparison.

According to a variant of the method, the appearance is a contrast. In this variant, the method comprises in response to the contrast value of the of the corresponding object exceeding the contrast value of the candidate image area by more than the second threshold amount, determining that the further object is a reflection, and in response to the contrast value of the of the candidate image area exceeding the contrast value of the corresponding object by more than the second threshold amount, determining that the further object is a reflection.

The method may further comprise determining that the further object is a source object of which the first object is a reflection. Information about the source object and its appearance may assist in compensating for its reflection.

In some variants, the method further comprises, in response to determining that the first object is a reflection, compensating for the reflection in the thermal image. Hereby, a better viewing experience may be provided for an operator. This may in turn reduce the risk that the operator overlooks important events in the thermal imagery. Compensating for the reflection may also reduce the risk of false detections in automated analytics of the thermal image.

The method may further comprise detecting a further object in the thermal image and determining that the further object is a source object of which the first object is a reflection. Information about the source object and its appearance may assist in compensating for its reflection.

Compensating for the reflection in the thermal image may comprise determining a reflection intensity gradient between a first pair of reference points of the first object, determining a source intensity gradient between a corresponding second pair of reference points of the source object, calculating a gradient ratio between the reflection gradient and the source gradient, for each pixel within the first object, calculating a compensated intensity value by calculating a difference between a captured intensity value of the pixel and a captured intensity value of a corresponding pixel of the source object multiplied by the gradient ratio. This approach makes it possible to more or less remove the reflection from the thermal image, thereby showing a thermal image which is closer to the truth.

In other variants, compensating for the reflection in the thermal image comprises interpolating between intensity values of pixels surrounding the first object. This is an uncomplicated way of compensating for the reflection and does not require finding a source object. The result may not necessarily represent the true conditions in the captured scene, but it may be good enough for providing a viewer with a thermal image without annoying reflections.

In still other variants, compensating for the reflection in the thermal image comprises storing background intensity values captured when no reflection is present in a location of the first object, for each pixel within the first object, replacing a captured intensity value of the pixel by a stored background intensity value of the pixel. As with the interpolation approach, such a background data approach may provide a good enough compensation in an uncomplicated way.

In yet other variants, compensating for the reflection in the thermal image comprises, for each pixel within the first object, selecting a representative pixel outside the location of the first object and replacing a captured intensity value of the pixel with a captured intensity value of the representative pixel. In this manner, the reflection may be compensated for by patching with thermal image data from a suitable image area outside the reflection. This may also be an uncomplicated way of providing a good enough compensation.

According to a second aspect, the abovementioned objects are achieved, in full or at least in part by means of a system for detecting a reflection in a first, thermal image captured by a thermal image sensor, the system comprising: an image receiver configured to receive the thermal image and a second image captured by a visible light image sensor, a near infrared sensor, or a short-wave infrared sensor, the thermal image and the second image having overlapping fields of view. The system further comprises a mapping module configured to determine a mapping from coordinates in the thermal image to coordinates in the second image, an object detector configured to detect a first object in a first position in the thermal image, an image area analyser configured to analyse a candidate image area in a second position in the second image to determine if an object equivalent to the first object is present in the candidate image area, the second position corresponding to the first position according to the relationship between the coordinates in the thermal image and the coordinates in the visible second image. The system also comprises a reflection determination module configured to determine that the first object is a reflection in response to a determination that there is no equivalent object in the candidate image area. Such a system makes it possible to detect thermal reflections in a relatively uncomplicated way. Detecting reflections in a thermal image in turn makes it possible to remove the reflections from thermal images, making the thermal images more useful for monitoring purposes.

The system may comprise a thermal camera and a visible light camera, a near infrared camera, or a short-wave infrared camera. Supplementing a thermal camera with a visible light camera, or a near infrared camera is a relatively inexpensive way of providing the means necessary for detecting reflections in thermal images captured by the thermal camera. Although generally more expensive than visible light cameras and near infrared cameras, adding a short-wave infrared camera may be a less expensive option than, e.g., adding one more long-wave infrared camera.

The system of the second aspect may generally be embodied in the same ways as the method of the first aspect, with accompanying advantages.

According to a third aspect, the abovementioned objects are achieved, in full or at least in part, by means of a thermal camera comprising a thermal image sensor and a system according to the second aspect. The thermal camera of the third aspect may generally be embodied in the same ways as the method of the first aspect and the system of the second aspect, with accompanying advantages.

According to a fourth aspect, the abovementioned objects are achieved, in full or at least in part, by means of a non-transitory computer readable storage medium having stored thereon instructions for implementing the method according to the first aspect, when executed on a device having processing capabilities. The fourth aspect may be varied in the same ways as the method of the first aspect, with accompanying advantages.

By "thermal image" is in the present application meant an image which captures long-wave infrared radiation or midwave infrared radiation. In the following, these will be referred to by their abbreviations, LWIR and MWIR, respectively.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which:

FIG. 13 is a simplified illustration of a thermal image with a source object and a reflection, FIG. 14 is an illustration of another thermal image, FIG. 15 illustration of a visible light image of the same scene as the thermal image in FIG. 14.

DETAILED DESCRIPTION OF EMBODIMENTS

Figure 1:
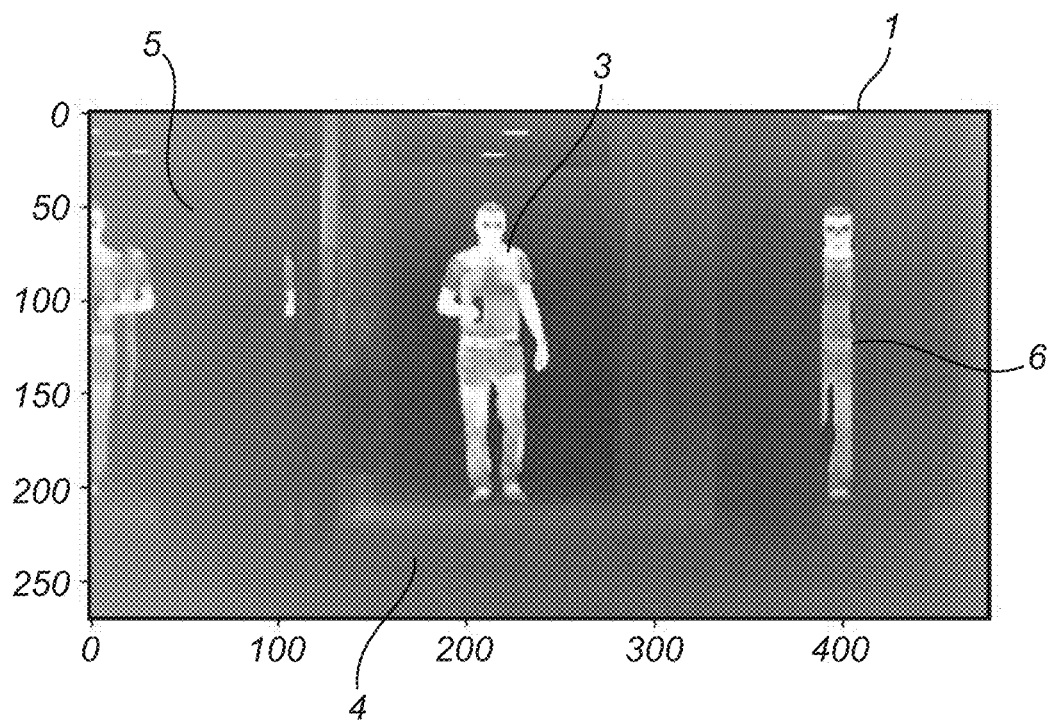
FIG. 1 is an illustration of a thermal image.
Figure 2:
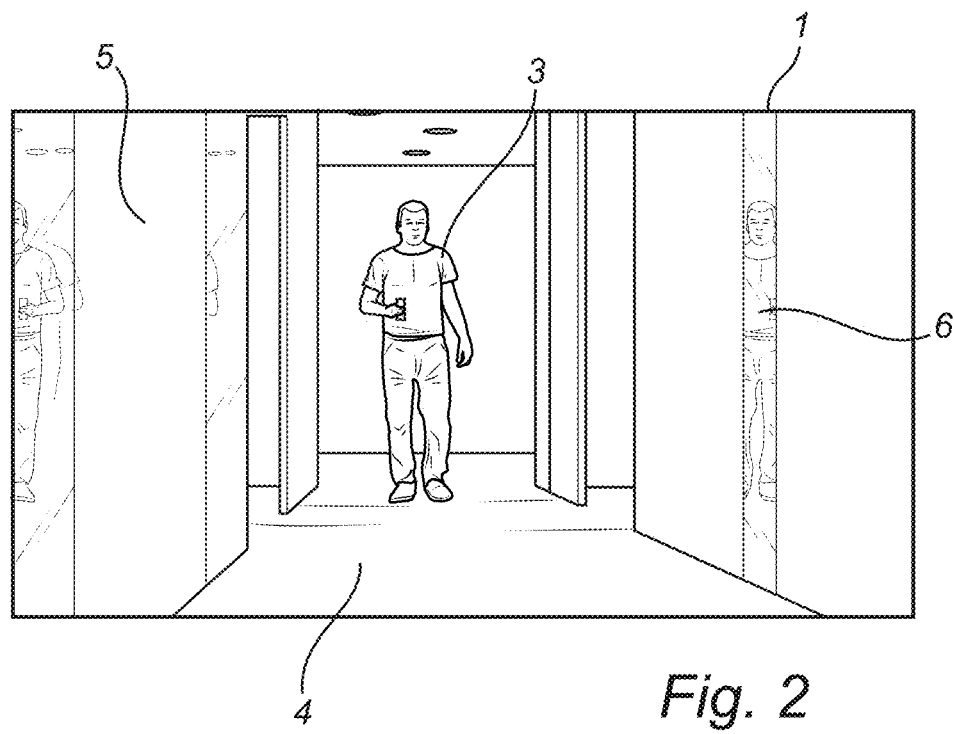
FIG. 2 is an illustration of a visible light image of the same scene as the thermal image in FIG. 1.

In FIG. 1, a first image 1 is shown. The first image 1 is a thermal image captured using a thermal image sensor, such as a microbolometer. In this example, the thermal image captures LWIR. As noted above, it could instead capture MWIR. In FIG. 2, a second image 2 is shown. The second image 2 has in this example been captured by a visible light sensor and will be referred to as a visible light image. The thermal image 1 and the visible light image 2 capture the same scene, in which a person 3 may be seen walking in a corridor 4. To the left and right, the corridor 4 is lined by glass surfaces 5, 6. The thermal image 1 and the visible light image 2 need not have exactly the same field of view, but their fields of view have to have an overlap. More specifically, they need to overlap in an area in which reflections in the thermal image 1 should be detected. For illustration purposes, in the example shown, the fields of view of the thermal image 1 and the visible light image 2 are essentially identical.

As may be seen in both the thermal image 1 in FIG. 1, and the visible light image 2 in FIG. 2, the person 3 is reflected in the glass surfaces 5, 6. Such reflections may be annoying to an operator viewing the images 1, 2. Furthermore, the reflections may cause false alarms if automated event detection using image analytics is used. It is therefore of interest to remove the reflections from the images. It may in many situations be harder for a viewer of a thermal image or an automated analytics algorithm analysing a thermal image to tell what is a real object and what is a reflection than it would be when viewing a visible light image. Specular reflectivity of LWIR contributes to this problem, as it makes reflections very similar to the real objects causing the reflections. It may therefore be particularly important to remove reflections from thermal images. It may also be noted that it may be relatively easy for a human viewer to tell a reflection from a real object in a scenario such as the one shown in FIG. 1, where the objects are humans. It may be more difficult to tell, e.g., a real object in the form of a flame or a smouldering heap of trash from its reflection. In contrast to human beings, flames and trash heaps do not have a well-defined expected shape or texture. When it is harder to tell if an object in a thermal image is real or a reflection, reflections may be more annoying and pose more of a problem, for a human viewer as well as for an automated analytics algorithm.

It may in this context be noted that reflections may occur in the monitored scene, such as on the glass surfaces 5, 6, or inside the thermal camera, such as on the inside of the viewing window, on lens surfaces, and on the sensor cover glass.

The reflective properties of the glass surfaces 5, 6 are not the same for LWIR and visible light. A cause of such differences is that LWIR sensors capture self-emitted radiation from objects in the scene, whereas visible light sensors mainly capture light that has been reflected off objects in the scene. Reflections of visible light may in some situations be more diffuse and reflections of LWIR more specular. Therefore, although the person 3 may easily be recognized as the same object in the thermal image 1 and the visible light image 2, the reflections of the person 3 differ more between the thermal image 1 and the visible light image 2. The inventors of the present invention have realised that this discrepancy may be used to advantage for detecting reflections in thermal images. By detecting objects in the thermal image and analysing a corresponding area in the visible light image it is possible to find objects in the thermal image that lack a counterpart in the visible image or that have a counterpart with a different appearance in the visible image. By this approach, reflections in the thermal image may be detected, as will be explained in further detail in the following. In some variants of the method, both the real object and its reflection need to appear in the thermal image for it to be possible to determine that there is a reflection in the thermal image. In other variants, it is sufficient that only the reflection appears in the thermal image, while the real object may be outside the field of view of the thermal camera.

Figure 3:
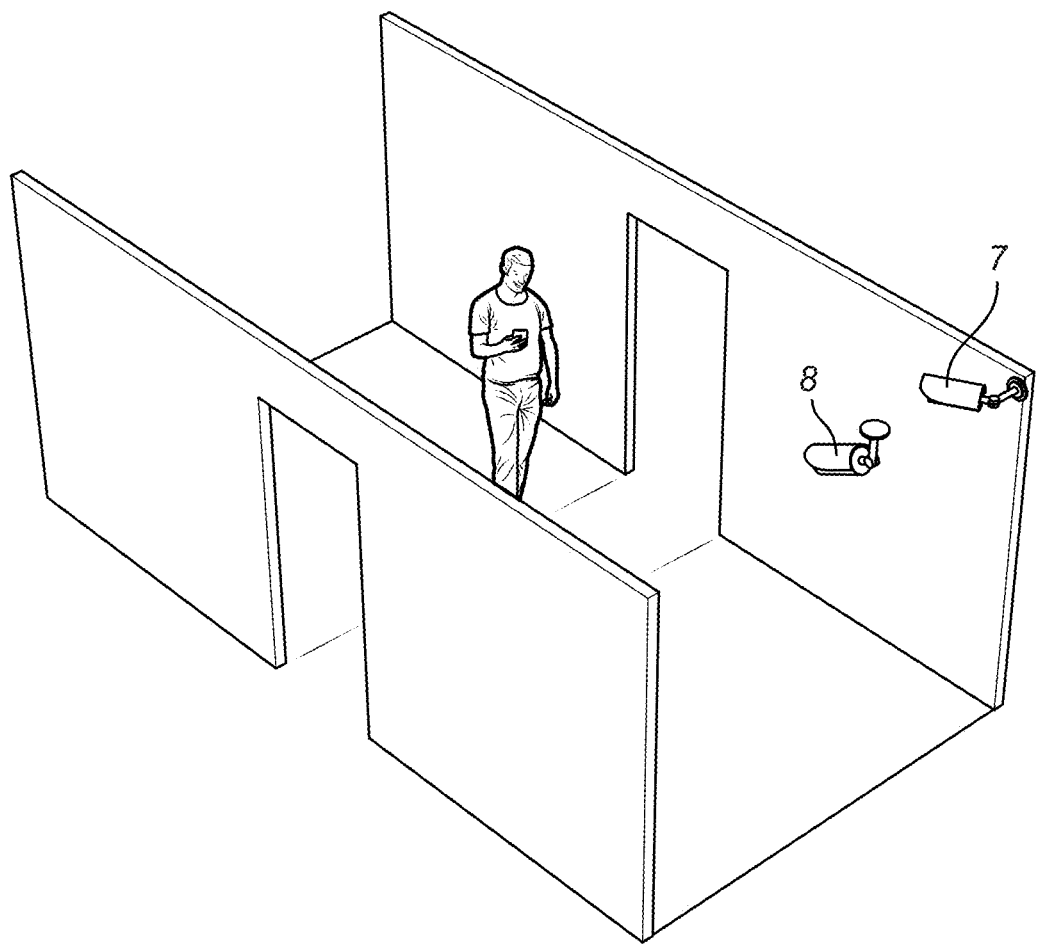
FIG. 3 is a view of a scene monitored by a first, thermal camera and a second, visible light camera.

FIG. 3 shows a scene monitored by a thermal camera 7 and a visible light camera 8.

According to a variant of the inventive method, a first image 1 is captured. This first image is a thermal image 1 captured by the thermal camera 7, which has a thermal sensor. A second image 2 is also captured. This second image is a visible light image 2, a NIR image, or a SWIR image. In the example discussed in the following, the second image is a visible light image 2 captured by the visible light camera 8, which has a visible light sensor. The skilled person will appreciate that the second image could just as well be a NIR image or a SWIR image. The cameras and the sensors will be discussed further later on.

As noted above, the fields of view of the thermal image 1 and the visible light image 2 have an overlap. If the fields of view coincide, it is possible to detect reflections in the entire thermal image. If only part of the thermal image 1 field of view is overlapped by the visible light image 2 field of view, then only reflections in the overlap area will be possible to detect using the inventive method.

Coordinates in the thermal image 1 are mapped to coordinates in the visible light image 2. This may be done in any suitable way and several known methods are available to the skilled person. For instance, a mapping function may be calculated from manual input, e.g., by an installer installing the thermal camera and the visible light camera. The installer may identify features in a thermal image captured by the thermal camera and indicate them, e.g., by clicking on them in the thermal image using a computer mouse. The installer may then identify corresponding features in a visible light image captured by the visible light camera and indicate them in the same way as in the thermal image. When a sufficient number of feature pairs have been indicated, a mapping function describing a relationship between coordinates in the thermal image and coordinates in the visible light image may be calculated for the entire images, or at least for the overlap area. Automatic mapping methods are also known. Some automatic mapping methods are based on finding a plurality of features, such as corners or edges of objects, appearing in both images and calculating a relationship between their coordinates. Other automatic mapping methods take the route via real-world coordinates, calculating a homography for each camera based on a respective camera matrix. If the fields of view of the two sensors coincide, coordinates in one of the images may assumed to be the same as those in the other image. Examples of automatic mapping methods are described in "Multi-Sensor Image Fusion and Its Applications", Blum et al, 2006 (see, e.g., chapters 1 and 3) and "Automatic Optical and Infrared Image Registration for Plant Water Stress Sensing", Yang et al., in "Image Fusion and Its Applications", 2011. The mapping of coordinates may advantageously be performed once and for all at installation of the cameras and the established relationship may then be retrieved when needed for the reflection detection. If a dual sensor camera is used, rather than two separate cameras, it may be possible to perform the mapping already at manufacture of the camera. If two separate cameras are used and the installation is displaced by vibrations or deliberately changed, an updated mapping may be done to determine a new relationship between the coordinates in the thermal image and the coordinates in the visible light image. Such updates may be scheduled to be performed at regular intervals or they may be performed ad hoc.

Figure 4:
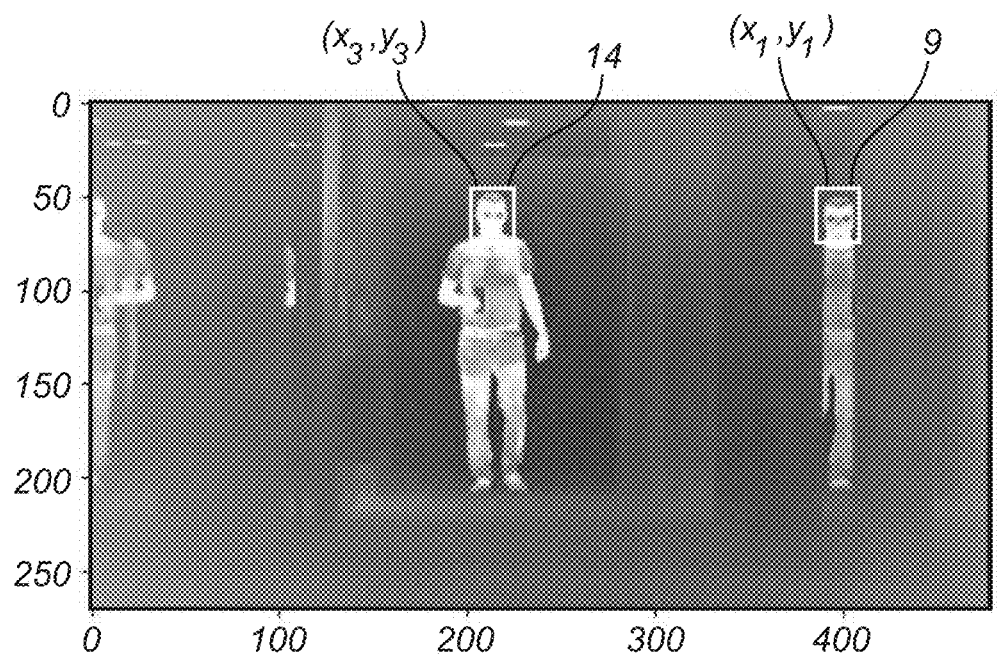
FIG. 4 shows objects in the form of faces detected in the thermal image in FIG. 1.
Figure 5:
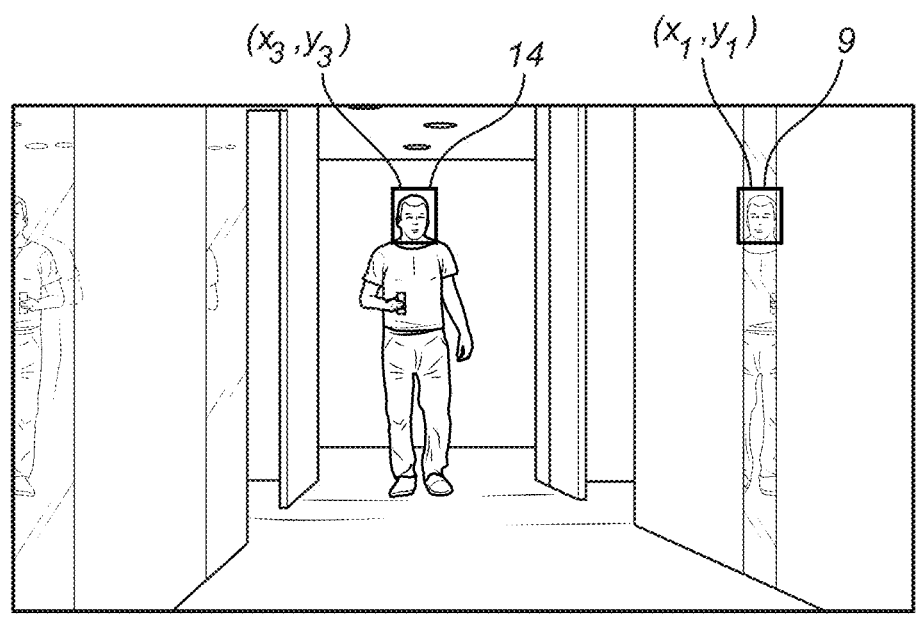
FIG. 5 shows areas marked in the visible light image of FIG. 2, which correspond to the faces marked in the thermal image in FIG. 4.

A first object 3 is detected in a first position $(x_1, y_1)$ in the thermal image 1. In the example shown in FIG. 4, the first object 9 is a reflected face. In FIG. 4, the first object 9 is marked by a bounding box. With the knowledge established through the above-mentioned mapping of the relationship between coordinates in the thermal image 1 and the visible light image 2, a candidate image area $A_c$ is identified in a second position $(x_2, y_2)$ in the visible light image. This second position $(x_2, y_2)$ corresponds to the first position $(x_1, y_1)$ in the thermal image 1. Provided that the mapping has been properly done, the first position $(x_1, y_1)$ in the thermal image 1 and the second position $(x_2, y_2)$ in the visible light image both represent the same real-world position in the monitored scene.

The candidate image area $A_c$ is analysed to determine if there is an object equivalent to the first object 9 in the visible light image 2. As hinted at before, this analysis may be performed in different ways depending on whether only the potential reflection is present in the thermal image, or both the real object and the reflection can be detected in the thermal image. An appearance of the candidate image area $A_c$ is compared to an appearance of the first object 9. The analysis may result in an object being found also in the visible light image 2 or no object being found in the visible light image. If no object is found in the candidate image area in the visible light image 2, it may readily be understood that the appearance of the first object differs significantly from the appearance of the candidate image area $A_c$. It may also be understood that there is no object equivalent to the first object 9 in the visible light image. If an object is found also in the candidate image area of the visible light image, this object could be referred to as a second object. However, since the present invention is applicable both to a situation where no object is found in the candidate image area $A_c$ and a situation where an object is found in the candidate image area $A_c$, reference will in the following for the most part not be made to the second object, but to the candidate image area $A_c$. Even if a second object is found in the candidate image area $A_c$, the appearance of the first object 9 may or may not differ from the appearance of the candidate image area $A_c$. If the second object differs significantly from the first object, it is not an equivalent object. As indicated above, if an object detection algorithm is used which determines an object class (e.g., human or vehicle) of each detected object, it may be determined that the second object is not an equivalent object if the object class of the first object is not the same as the object class of the second object.

The appearance of the first object 1 and of the candidate image area $A_c$ may be a shape, a texture, or a pattern of the respective object or area. A combination of two or more of a shape, a texture, and a pattern may also be used as the appearance. Considering that thermal images and visible light images are inherently different, the appearance of the first object 9 and the candidate image area $A_c$ need not be identical for the two to be considered similar enough to represent the same real-world object in the monitored scene, a first threshold amount $\delta_1$ is determined and this first threshold amount $\delta_1$ is used when comparing the appearances of the first object 9 and the candidate image area $A_c$. If the appearance of the first object 9 differs from the appearance of the candidate image area $A_c$ by less than the first threshold amount $\delta_1$, the first object 9 and the candidate image area $A_c$ are considered similar. Such similarity indicates that the same real-world object is represented in the thermal image 1 and the visible light image 2, and hence that the first object 9 is real. This can also be referred to as the first object 9 having an equivalent in the candidate image area $A_c$ in the visible light image. On the other hand, if the appearance of the first object 1 and the candidate image area $A_c$ differ by more than the threshold amount, they are not considered similar, and this indicates that the first object 9 is not a real object. In other words, there is no object in the candidate image area $A_c$ that is equivalent to the first object 9. Therefore, if the appearance of the first object 9 and the appearance of the candidate image area $A_c$ differ by more than the threshold amount $\delta$, the first object 9 is determined to be a reflection. The first threshold amount $\delta_1$ can be established empirically and will generally depend on the material that gives rise to reflections. If, for instance, a Michelson contrast is used as the measure of the appearance, it may be reasonable to assume that if the contrast value of the candidate image area is less than 10% of the contrast value of the first object, then the first object is a reflection.

If both the reflection and the real object are within the field of view of the thermal camera 7, the analysis of the candidate image area $A_c$ may be performed in a different way. The purpose of the analysis is also in this scenario to determine if there is an object in the candidate image area $A_c$ that is equivalent to the first object in the thermal image. In addition to the first object 1, a further object, also referred to as a third object 14, is detected in a third position $(x_3, y_3)$ in the thermal image 1. If the first object 9 and the third object are sufficiently similar, it may be assumed that one of them is a real object and the other a reflection of the real object. In order to determine if either one of the first object 9 and the third object 14 is a reflection a potential object pair is searched for in the visible light image 2. As before, the relationship between coordinates in the thermal image and coordinates in the visible light image is known. Hence, a fourth position $(x_4, y_4)$ in the visible light image corresponding to the third position $(x_3, y_3)$ can be found. If a fourth object is detected in the fourth position, this fourth object is an object corresponding to the third object 14. Therefore, the fourth object may also be referred to as the corresponding object. If no object is found in the fourth position, it may, in the same way as described above for the scenario where only one object is detected in the thermal image, be determined that the third object is a reflection. If a corresponding object is found in the fourth position, a comparison is made between the candidate image area Ac and the fourth object. A convenient way of comparing the candidate image area $A_c$ and the fourth object is to study contrast values. For instance, the Michelson contrast may be calculated for the candidate image area and for the fourth object. The contrast value of the candidate image area $A_c$ is compared to the contrast value of the fourth object. If the contrast value of the fourth object exceeds the contrast value of the candidate image area by more than a second threshold amount $\delta_2$, it may be assumed that the fourth object is a real object, and that the candidate image area contains no object at all or a reflection of the fourth object. Therefore it can be determined that the first object in the thermal image is a reflection. Conversely, if the contrast value of the candidate image area exceeds the contrast value of the fourth object by more than the second threshold amount $\delta_2$, it may be assumed that there is a real object in the candidate image area and that the fourth object is a reflection. Therefore, it is determined that the third object is a reflection. The second threshold amount $\delta_2$ may be established according to the same principles as discussed above for the first threshold amount $\delta_1$.

Once it has been determined that the first object 9 is a reflection, different actions may be taken. In the following, the first object 9 will be discussed, but it should be understood that the same actions may be taken regarding the third object if it is the third object that has been determined to be a reflection. For instance, if an automated event detection algorithm is applied to the image, the detection of the first object 9 may be suppressed, such that it does not trigger any event that should be triggered only by a real object. If the thermal image 1 is to be viewed by a human viewer, a flag or other indication may be added to the image, indicating that the first object 9 is a reflection and should be disregarded. It may, however, be more useful to remove the first object 9 from the thermal image 1, such that the human viewer is not distracted by the reflection. For an automated analytics algorithm, it may be less important if the reflection is removed from the thermal image or if the algorithm is in another way instructed to disregard the reflection.

If it has been determined that the first object 9 is a reflection, an area in the first position $(x_1, y_1)$ in which the first object 9 was detected may be tagged and stored as being a reflective area. This information may then be used in later captured thermal images, such that if a later object is detected in that reflective area, it may be determined that the later object is also a reflection, without having to make a comparison with a corresponding visible light image. This may make reflection detection more efficient, as it requires less computation.

Although efficient, making the assumption that any object detected in what has been identified as a reflective area is a reflection comes with the risk of falsely identifying real objects as reflections. Sometimes real objects may for example appear in front of a reflective area. In order to significantly reduce that risk, it may be preferable to make a comparison to a candidate image area in a corresponding visible light image every time an object is detected in the thermal image. The risk of falsely identifying real objects as reflections may also be reduced by taking into account factors such as a viewing angle of the thermal camera and lighting conditions in the scene. Reflective properties of surfaces in the monitored scene may differ with different viewing angles and with different lighting conditions. Thus, a compromise between efficiency and risk of false reflection detections may be to assume that any object detected in an area that has been identified as a reflective area is a reflection only if the viewing angle of the thermal camera is the same as it was when the identification of the reflective area was made and/or only under the same lighting conditions. Using this approach, if the thermal camera has panning and tilting capability, reflective areas may be identified for a number of different pan/tilt positions, such as positions on a so-called guard tour, and when the thermal camera 7 is directed at a given position, any object detected in the reflective areas identified for that position are assumed to be reflections. The identification of reflective areas may be updated at regular intervals or on an ad hoc basis.

No matter if the first object is determined to be a reflection by an actual comparison to a visible light image, or by being detected in an area that has been identified as being a reflective area, an advantage of having determined that it is a reflection is that it may be possible to compensate for the reflection in the thermal image.

There are several possible ways of performing the compensation. As noted above, for an automated analytics algorithm, it need not be necessary to remove the reflection from the thermal image. Instead, a good solution may be to instruct the algorithm to ignore the first object. For a human viewer it will generally be preferable to remove the reflection from the thermal image, or at least make the reflection less salient. It may in some cases be enough to make the reflection less noticeable, such that it does not distract the viewer. In some cases, it may be desirable to remove the reflection from the thermal image.

Figure 6:
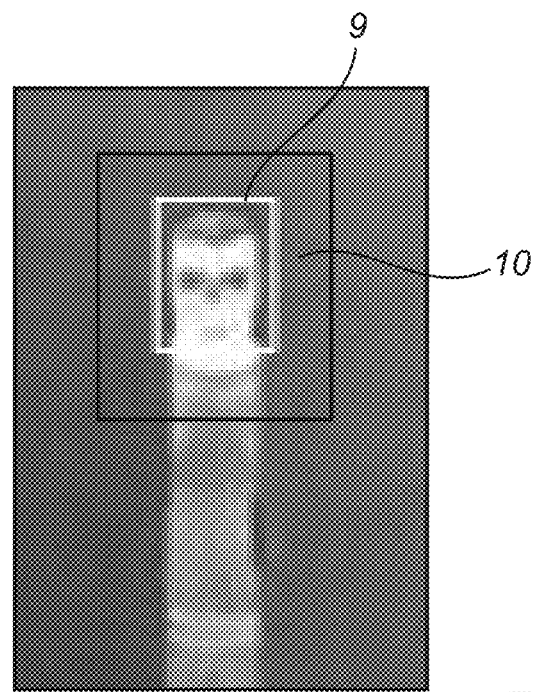
FIG. 6 illustrates an interpolation approach for compensating for a reflection in thermal image in FIG. 1.

One way of removing or compensating for the reflection is to use interpolation, as will be explained with reference to FIG. 6. The interpolation approach is based on the assumption that it is reasonable to believe that the area where the reflection occurs is similar to its immediate surroundings. Surrounding pixels 10 in an image area outside the first object 9 are identified and for each pixel inside the area of the first object 9, an interpolated intensity value is calculated based on the intensity values of the surrounding pixels. The interpolation may be more or less complex. In a simple form, interpolated intensity values may be calculated row by row in the area of the first object 9, based on the intensity values of the surrounding pixels 10 just to the left and right of that row. In more complex interpolations, more of the surrounding pixels may be taken into account for each pixel within the first object 9. By replacing the intensity values inside the first object 9 with interpolated intensity values, the reflection can be removed from the thermal image 1. Interpolation provides a computationally simple way of removing reflections, although it does not necessarily provide a true image of what the scene would have looked like, had there been no reflection. Generally, removing the reflection and replacing it with an interpolation is a pragmatic solution that makes the thermal image 1 more useful to a human viewer and also less prone to triggering false positives in an automated analytics algorithm. The advantages of a low computational cost have to be weighed against the risk of removing an actual object hiding in the reflection. Thus, in some scenarios, a more computationally heavy compensation method may be warranted.

Figure 7:
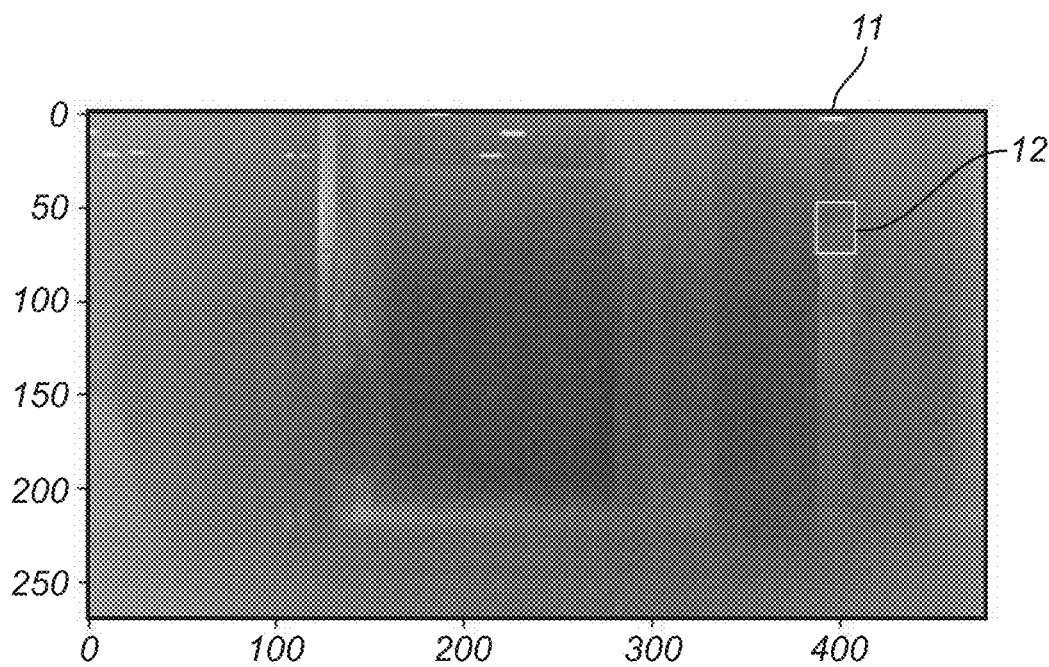
FIG. 7 shows a background image of the scene captured in the thermal image in FIG. 1.

Another way of removing or compensating for the reflection is to use historical data. This will be discussed with reference to FIG. 7. If the reflection does not always appear in thermal images of the scene, intensity values of all pixels in a thermal image without reflections may be stored as a background image 11. At a later point in time, when it has been determined that the first object 9 is a reflection, the reflection may be removed by replacing the intensity values of the pixels making up the first object 9 in the thermal image 1 by the stored background intensity values of those pixels 12. If a reflective area has been identified, it need not be necessary to store background intensity values for all pixels of the background image 11, but only for the reflective area, such as the pixels marked by 12 in FIG. 7. Similar to the interpolation approach, using a background image is a computationally efficient way of compensating for reflections. However, using historical data also comes with the risk of missing events in the scene, should a real object appear in the image area of the reflection.

Figure 8:
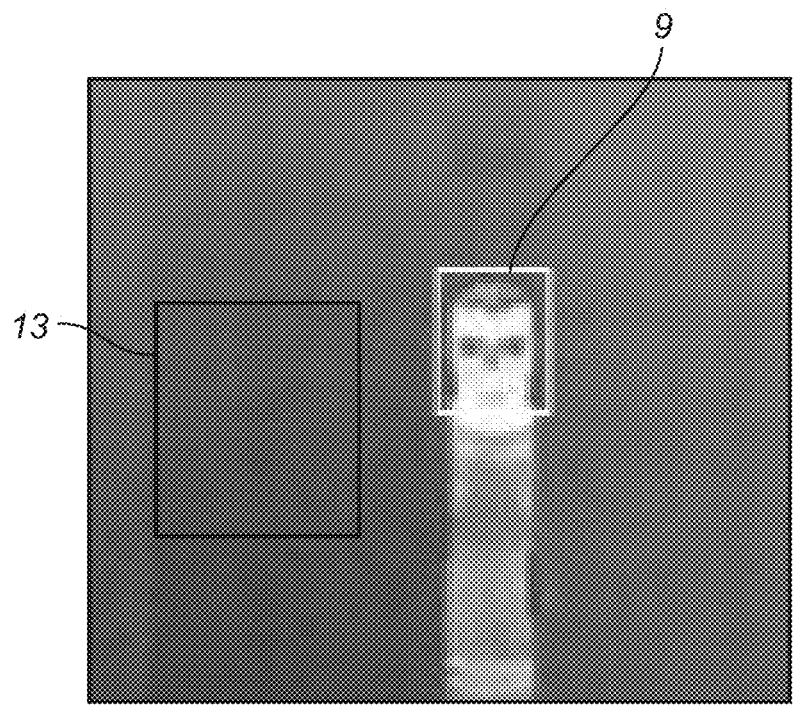
FIG. 8 illustrates a cloning approach for compensating for a reflection in the thermal image in FIG. 1.

Yet another way of removing or compensating for the reflection is to patch the area of the first object 9 by cloning another area of the thermal image 1. Reference may here be made to FIG. 8. An image area 13 outside the first object 9 is selected. The selected area 13 should preferably be representative of the image area where the first object 9 appears, had there not been any reflection. In a relatively homogeneous or uneventful scene, it may for instance be reasonable to assume that an image area next to the first object 9 is similar to what the areas of the first object would have looked like without the reflection. The selection of the image area 13 to clone may be done manually or automatically. If it is done manually, it is advantageous if the selection of the image area 13 to clone can be done once and for all, e.g., at installation of the thermal camera 7. The reflection may according to this approach be removed by replacing the intensity values within the area of the first object 9 with intensity values of corresponding pixels in the selected area 13. This approach is also relatively computationally uncomplicated but comes with the same caveats as the interpolation approach and the background image approach described above.

If the reflection is caused by a surface in the scene, and not a surface inside the thermal camera 7, the reflection may be removed or compensated for by studying a source object in the thermal image 1. The source object is an object of which the first object 9 is a reflection. This approach will be discussed in closer detail with reference to FIGS. 4, and 9-12.

As has been described above, the first object 9 in FIG. 4 has been determined to be a reflection. A further object, also referred to as a third object 14, is detected in a third position ($x_3$, $y_3$) in the thermal image 1. It is determined that the third object 14 is a source object of which the first object 9 is a reflection. The third object 14 may be identified as the source object by comparing the third object to the first object 9. If the third object 14 and the first object have similar appearances, the third object 14 is possibly the source of the first object 9. If an area in the visible light image 2 in a position corresponding to the position of the third object in the thermal image 1 has an appearance that is similar to the appearance of the third object, then the third object 14 may be determined to be a real object and it may be determined to be the source object 14 giving rise to the reflection. Having identified the source object 14, of which the first object 9 is a reflection, the reflection may be removed or compensated for by analysing gradients of intensity values of the first object 9 and of the source object 14. Gradients may, for instance, be deduced by applying a Sobel filter to the thermal image 1. Alternatively, another high-pass filter may be applied.

Figure 9:
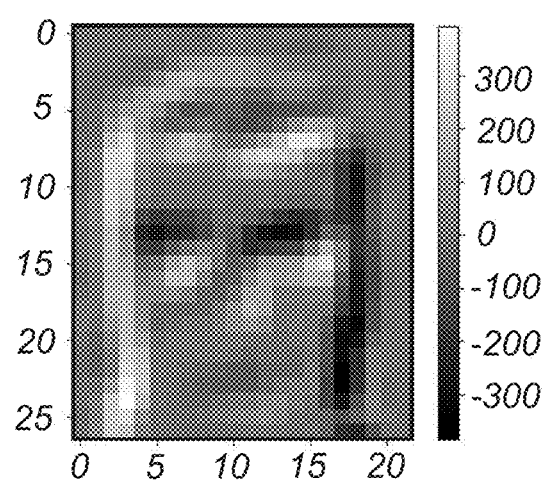
FIG. 9 shows the face detected in the centre of the image in FIG. 4 with a Sobel filter applied for analysing gradients.
Figure 10:
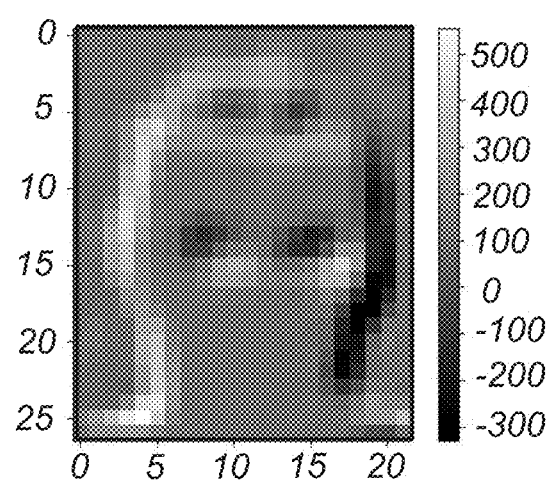
FIG. 10 shows the face detected to the right in the image in FIG. 4 with a Sobel filter applied.
Figure 11:
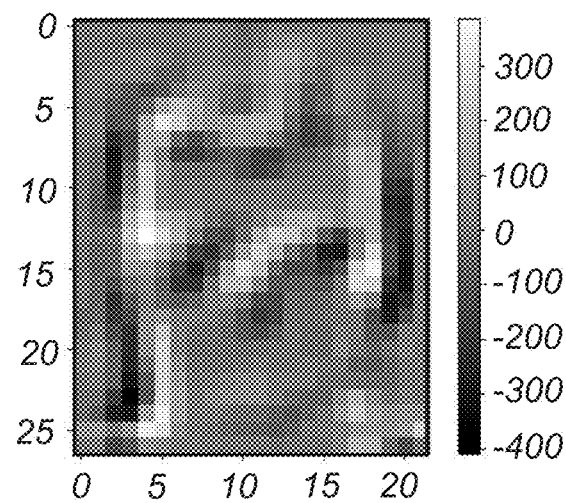
FIG. 11 shows a difference image constituting a difference between the gradients in FIG. 9 and the gradients in FIG. 10.

In FIG. 9, the first object 1 is shown with a Sobel filter applied. Correspondingly, in FIG. 10, the source object 14 is shown with a Sobel filter applied. The Sobel filtered images in FIGS. 9 and 10 illustrate gradients between points in the respective object image areas. The grey scale of the Sobel filtered images illustrates gradient amounts from −400 to 400.

A reflection intensity gradient $G_r$ between a first pair of reference points of the first object 9 is determined. Analogously, a source intensity gradient $G_s$ between a corresponding second pair of reference points of the source object 14 is determined. A gradient ratio $R_G$ is calculated by dividing the reflection gradient $G_r$ by the source intensity gradient $G_s$.

Figure 12:
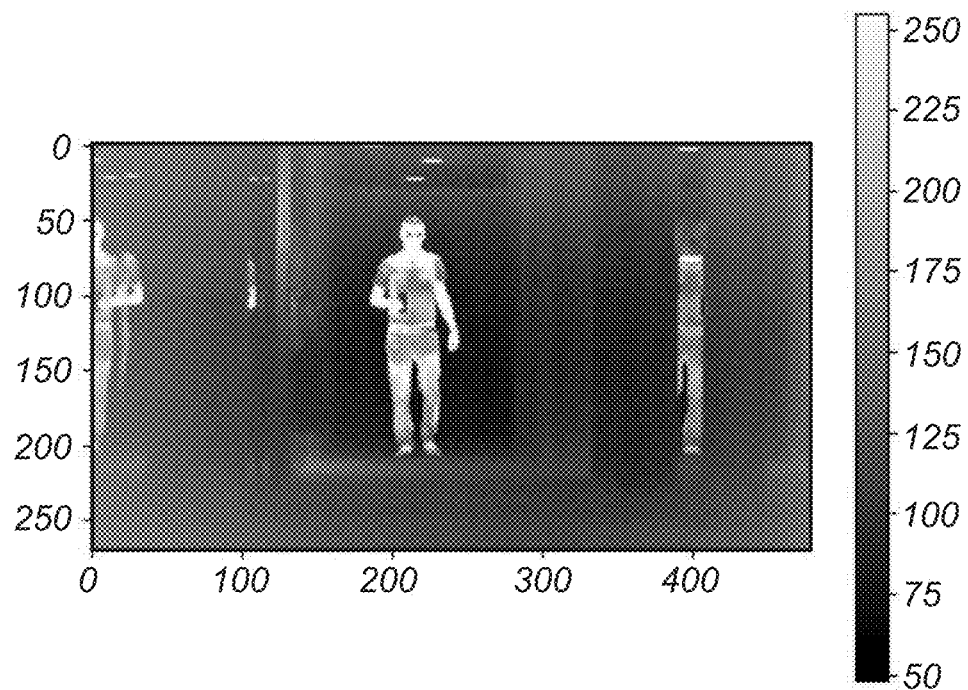
FIG. 12 is a version of the thermal image in FIG. 1 with the reflected face to the right removed.

For each pixel within the first object 9, a gradient difference $\Delta_G$ is calculated between the reflection intensity gradient $G_r$ and the source intensity gradient $G_s$ multiplied by the gradient ratio $R_G$ to calculate a compensated intensity value Icomp of the pixel. By replacing the captured intensity value of each pixel within the first object 9 with its compensated intensity value, the reflection can be removed from the thermal image, as illustrated in FIG. 12. This gradient approach is a way of deducing a relative reflectance of the reflective area, such that it may be compensated for.

With reference to FIG. 13, a simplified example of the gradient approach may schematically be described by the following formulae:

$$G_r = I_{B1} - I_{a1}$$

$$G_s = I_{b2} - I_{a2}$$

$$I_{comp} = I_{a1} - I_{a2} \cdot \frac{G_r}{G_s}$$

Here, $I_{a1}$ is the intensity in point $P_{a1}$, and $I_{b1}$ is the intensity in point $P_{b1}$ in the first object, $I_{a2}$ is the intensity in point $P_{a2}$, and $I_{b2}$ is the intensity in point $P_{b2}$ in the source object.

Although the now described gradient approach may yield a compensated image that is closer to a true image of the scene without reflection, there are still caveats. If there is no real object in the image area of the reflection, the compensated image may be close to the truth. However, if there is a real object in addition to the reflection, e.g., because a real object occludes part of the reflective area, compensating with the help of gradients in the source object may distort the intensity values in the image areas of the first object 9. Again, the importance of not missing real objects needs to be weighed against the importance of avoiding false alarms and annoying reflections.

FIGS. 14 and 15 show a picture pair similar to FIGS. 1 and 2. In the same way as was described in relation to FIGS. 1 and 2, FIG. 14 shows a thermal image 21 of a scene, and FIG. 15 shows a visible light image 22 of the same scene. The only important difference between the thermal image 21 in FIG. 12 and the thermal image 1 in FIG. 1 is that the first object 29 is a reflection caused by reflective surfaces inside the thermal camera that captured the thermal image 21, whereas the first object 9 in the thermal image in FIG. 1 was caused by a reflective surface in the scene. Reflections may arise inside the thermal camera because of reflective surfaces on the front glass, lenses, and sensor package. The method of detecting reflections caused by reflective surfaces inside the camera is the same as the method described above in connection with FIGS. 1 and 2. Thus, when the first object 29 has been detected in the thermal image 21, a corresponding candidate image area $A_{c2}$ is identified in the visible light image 22 in FIG. 15 and the appearances of the first object 29 and the candidate image area $A_{c2}$ are compared. If they differ by more than the threshold amount δ, it is determined that the first object 29 is a reflection.

The reflection may be removed or compensated for in the thermal image 21 in the same ways as described above. The interpolation, cloning, and background image approaches may be used unaltered, regardless of the cause of the reflection. The gradient approach may need to be modified, as it may be more complicated to identify the source object. Internal reflexes will make the first object appear to be at a different distance from the camera than the corresponding real object, such that the first object may be out of focus. A modification of the gradient approach may be to include in the calculation a ratio between the average intensity of the source object and the average intensity of the reflection and then replace pixel intensity in the same way as described above.

Figure 16:
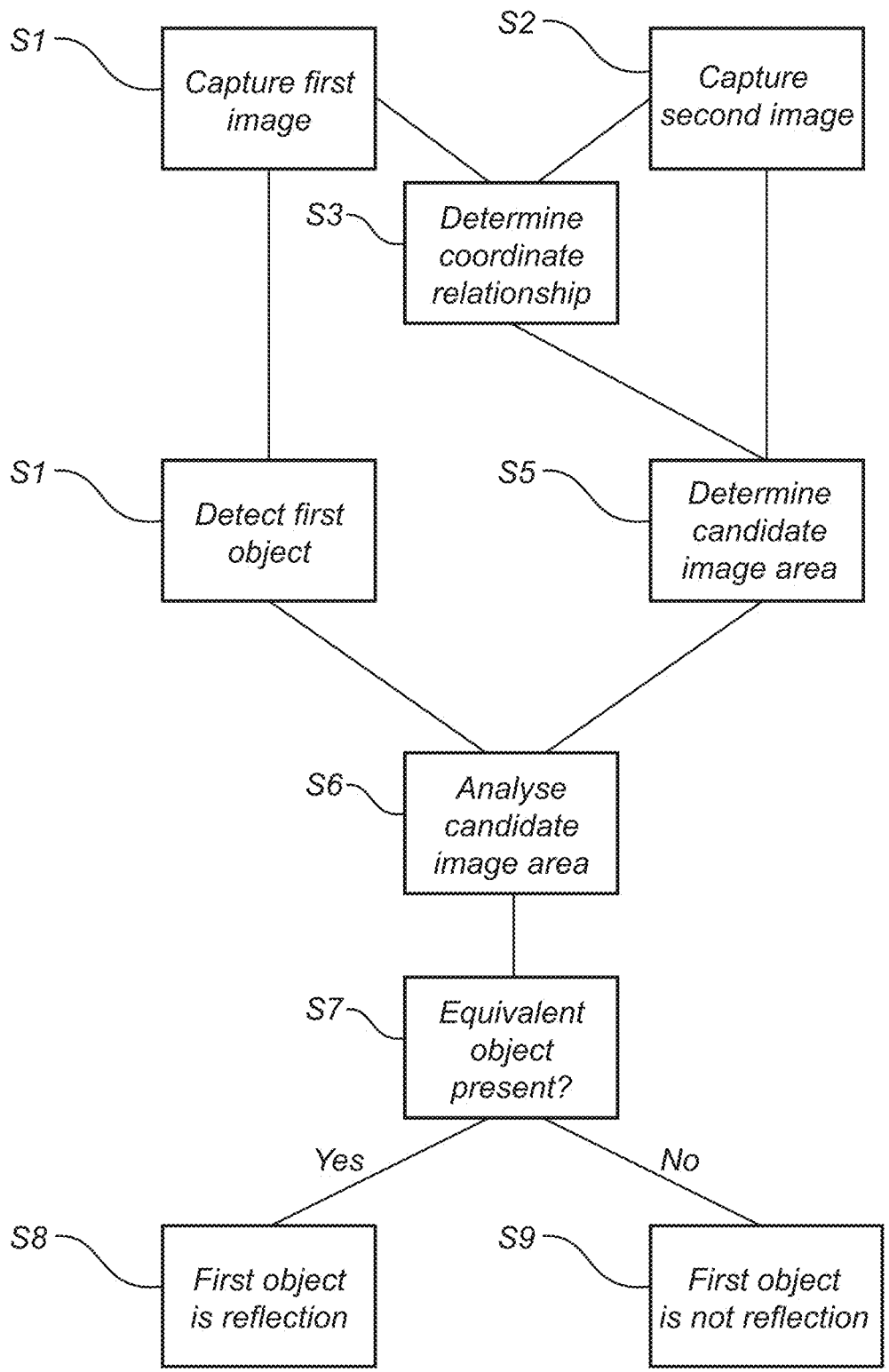
FIG. 16 is a flowchart illustrating a variant of the inventive method.

The inventive method will now be summarised with reference to the flow chart in FIG. 16.

In step S1, a first image is captured. The first image is a thermal image captured by a thermal image sensor. In step, S2, a second image is captured by a second sensor. The second sensor is a visible light sensor, a NIR sensor, or a SWIR sensor.

A relationship between coordinates in the thermal image and coordinates in the second image is determined in step S3. This may be done at any point in time before the relationship is needed for further steps of the method.

In step S4, a first object is detected in a first position in the thermal image. A corresponding second position is found in the second image. In order to find this second position, the relationship between coordinates in the thermal image and coordinates in the second image needs to be known. In step S5, a candidate image area in the second position in the second image is identified.

In step S6, the candidate image area is analysed to determine if an object equivalent to the first object is present in the candidate image are. In step S7, it is checked whether an equivalent object has been found. If it is found that there is no equivalent object in the candidate image area, in step S8 it is determined that the first object is a reflection.

As described above, the analysis of the candidate image area may be performed in different ways. If only the first object has been detected in the thermal image and no further or o third object has been detected, it may be checked if there is an object or not in the candidate image area. If no object is found in the candidate image area, it may be deduced that the first object is a reflection. If an object is found in the candidate image area, the appearance of that object may be compared to the appearance of the first object, and if they differ sufficiently, it may again be determined that the first object is a reflection.

Depending on how important it is to detect possible reflections in the thermal image, an outcome that the appearance of the first object does not differ from the appearance of the candidate image area by more than the first threshold amount may lead to different conclusions. The same applies if the contrast value of the candidate image area does not differ from the contrast value of the fourth object by more than the second threshold amount. In the simplest solution, if it is found that the difference does not exceed the respective threshold amount, it may be determined that the first object is not a reflection. If it is important not to miss any reflections in the thermal image, a finding that the difference does not exceed the threshold amount may lead to a decision to make further analysis. For instance, an additional threshold amount may be used, which is lower than the first-mentioned threshold amount (i.e. the first threshold amount or the second threshold amount, respectively). If the difference does not exceed the additional threshold amount either, it may be determined that the first object is not a reflection and if the difference does not exceed the first-mentioned threshold amount, but does exceed the additional threshold amount, it may be decided that further analysis is needed.

Figure 17:
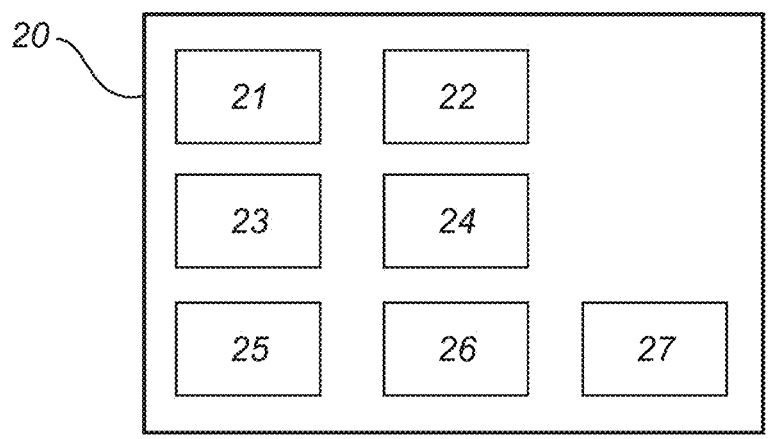
FIG. 17 is a block diagram of a system for detecting a reflection in a thermal image.

With reference to FIG. 17, a system 20 according to an embodiment of the invention will now be described. Such a reflection detection system may be used in accordance with the method described above. The system 20 includes an image receiver 21. The image receiver 21 is configured to receive the thermal image and the second image. As noted above, the second image is a visible light image, a NIR image, or a SWIR image. The thermal image and the second image have overlapping fields of view.

The system 20 further includes a mapping module 22 which is configured to determine the relationship between coordinates in the thermal image and coordinates in the second image. The establishment of that relationship may be performed by the system itself or it may be retrieved from an external device. For instance, the relationship could be retrieved in the form of a lookup table, or a mathematical formula.

Additionally, the system 20 includes an object detector 23, which is configured to detect a first object in a first position in the thermal image. The system also includes an image area analyser 24, which is configured to analyse a candidate image area in a second position in the second image to determine if an object equivalent to the first object is present in the candidate image area. Using the relationship between the coordinates in the thermal image and the coordinates in the second image, the second position is chosen such that it corresponds to the first position in the thermal image. In other words, the first position in the thermal image and the second position in the second image should both represent the same position in the captured scene.

Furthermore, in some embodiments the system 20 includes a comparing module 25. Depending on the scenario, i.e. if only the first object has been detected in the thermal image or if also a further object has been detected, the comparing module may be configured to compare an appearance of the first object and an appearance of the candidate image area, or to compare a contrast value of the candidate image area and a contrast value of the fourth object. The system 20 also includes a reflection determination module 26, which is configured to determine that the first object is a reflection if the outcome of the analysis of the candidate image area is that there is no equivalent object in the candidate image area.

The system 20 may also include a compensator 27, which is configured to remove or compensate for the detected reflection.

Figure 18:
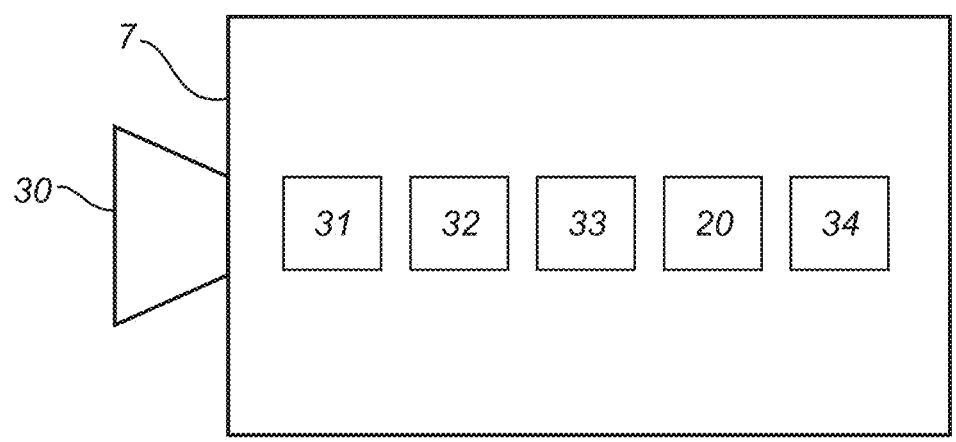
FIG. 18 is a block diagram of a thermal camera.

The system 20 may be incorporated in a thermal camera, such as the thermal camera 7 shown in FIG. 3. A block diagram of the camera 7 is shown in FIG. 18. The thermal camera 7 has a lens 30 through which LWIR in the scene is captured by a sensor 31. The sensor 31 may be a microbolometer. The thermal camera 7 also includes an image processor 32, an encoder 33, and a network interface 34, through which images captured by the thermal camera 7 may be transmitted for viewing and/or storage. The thermal camera 7 may also include other components, but as these are not necessary for the explanation of the present invention, they will not be discussed here. As already noted, the thermal camera 7 may include the reflection detection system 20, making it possible to detect reflections in images captured by the thermal camera 7. If the reflection detection system is incorporated in the thermal camera 7, reflections may be detected and possibly compensated for already before images are transmitted from the thermal camera 7.

Instead of incorporating the reflection detection system 20 in the camera 7, the system 20 may be arranged separately and operationally connected to the thermal camera 7. A separate reflection detection system 20 need not be directly connected to the thermal camera but could be connected to or incorporated in a video management system to which images from the thermal camera are transmitted. In such case, one reflection detection system 20 may be used for detecting reflections in thermal images from more than one thermal camera 7.

Regardless of whether the reflection detection system is incorporated in a thermal camera or arranged separately, it may also include a visible light camera 8, a NIR camera, or a SWIR camera.

The reflection detection system 20 may be embodied in hardware, firmware, or software, or any combination thereof. When embodied as software, the reflection detection system may be provided in the form of computer code or instructions that when executed on a device having processing capabilities will implement the temperature control method described above. Such device may for instance be, or include, a central processing unit (CPU), a graphics processing unit (GPU), a custom-made processing device implemented in an integrated circuit, an ASIC, an FPGA, or logical circuitry including discrete components. When embodied as hardware, the system may comprise circuitry in the form of an arrangement of a circuit or a system of circuits. It may for example be arranged on a chip and may further comprise or be otherwise arranged together with software for performing the processing.

It will be appreciated that a person skilled in the art can modify the above-described embodiments in many ways and still use the advantages of the invention as shown in the embodiments above. As an example, and as already indicated above, the second image need not be a visible light image, but could be a NIR image, or a SWIR image.

The cameras 7, 8 may be digital cameras or they may be analogue cameras connected to a digitalisation device.

The thermal image sensor and the visible light sensor (or NIR or SWIR sensor) may be arranged in separate cameras, as shown in FIG. 3. Alternatively, the two sensors may be arranged in one and the same camera. Such dual sensor cameras are known and available, e.g., from Axis Communications AB (see for instance, AXIS Q8752-E bispectral PTZ camera).

The cameras may both have a fixed field of view. Alternatively, one or both may have a variable field of view, having zoom functionality or PTZ functionality (i.e. pan, tilt, zoom functionality).

The thermal image sensor may be a microbolometer. Alternatively, the thermal image sensor may be any other type of thermal sensor, such as a cooled thermal sensor.

In the example above, the contrast value is described as being a Michelson contrast. Other contrast measures may be used instead, such as a Weber contrast or an RMS contrast. The contrast value may also be based 10 on histograms of the images, studying differences in luminance and chrominance.

The second image sensor may be CCD sensor or a CMOS sensor.

Thus, the invention should not be limited to the shown embodiments but should only be defined by the appended claims.

The invention claimed is:

1. A computer-implemented method of detecting a reflection in a thermal image captured by a thermal image sensor, the method comprising:
    capturing a second image by a visible light sensor, near infrared sensor, or short-wave infrared sensor having a field of view which overlaps a field of view of the thermal image,
    determining a mapping from coordinates in the thermal image to coordinates in the second image,
    detecting a first object in a first position in the thermal image,
    analysing a candidate image area in a second position in the second image to determine if an object equivalent to the first object is present in the candidate image area, wherein the analysing includes comparing an appearance of the first object to an appearance of the candidate image area, the second position corresponding to the first position according to the mapping from the coordinates in the thermal image to the coordinates in the second image, and
    in response to the appearance of the first object and the appearance of the candidate image area differing by more than a first threshold amount determining that the first object in the thermal image is a reflection, wherein the method further comprises:
    detecting a further object in a third position in the thermal image, and
    wherein analysing the candidate image area comprises:
        detecting a corresponding object in a fourth position in the second image, the fourth position corresponding to the third position according to the mapping from the coordinates in the thermal image to the coordinates in the second image,
    comparing an appearance of the corresponding object to a contrast value of the candidate image area to determine if the corresponding object is an object equivalent to the first object,
    in response to the appearance of the corresponding object differing from the appearance of the candidate image area by more than a second threshold amount, determining that the first object or the further object is a reflection, and
    compensating for the first object or the further object determined to be a reflection in the thermal image, the compensating comprises
    determining that the further object is a source object of which the first object is a reflection,
    determining a reflection intensity gradient between a first pair of reference points of the first object,
    determining a source intensity gradient between a corresponding second pair of reference points of the source object,
    calculating a gradient ratio between the reflection intensity gradient and the source intensity gradient, and
    for each pixel within the first object, calculating a compensated intensity value by calculating a difference between a captured intensity value of the pixel and a multiplication of a captured intensity value of a corresponding pixel of the source object and the gradient ratio.

2. The method according to claim 1, wherein compensating for the first object or the further object determined to be a reflection in the thermal image comprises:
    interpolating between intensity values of pixels surrounding the first object.

3. The method according to claim 1, wherein compensating for the first object or the further object determined to be a reflection in the thermal image comprises:
    storing background intensity values captured when no reflection is present in a location of the first object, and
    for each pixel within the first object, replacing a captured intensity value of the pixel by a stored background intensity value of the pixel.

4. The method according to claim 1, wherein compensating for the first object or the further object determined to be a reflection in the thermal image comprises:
    for each pixel within the first object, selecting a representative pixel outside a location of the first object and replacing a captured intensity value of the pixel with a captured intensity value of the representative pixel.

5. A non-transitory computer readable storage medium having stored thereon instructions for implementing the method according to claim 1, when executed on a device having processing capabilities.

6. A system for detecting a reflection in a thermal image captured by a thermal image sensor, the system comprising:
    circuitry configured to:
        receive the thermal image and a second image captured by a visible light image sensor, a near infrared sensor, or a short-wave infrared sensor, the thermal image and the second image having overlapping fields of view,
        determine a mapping from coordinates in the thermal image to coordinates in the second image,
        detect a first object in a first position in the thermal image, analyse a candidate image area in a second position in the second image to determine if an object equivalent to the first object is present in the candidate image area by comparing an appearance of the first object to an appearance of the candidate image area, the second position corresponding to the first position according to the mapping from the coordinates in the thermal image to the coordinates in the second image, in response to the appearance of the first object and the appearance of the candidate image area differing by more than a first threshold amount, determine that the first object in the thermal image is a reflection, detect a further object in a third position in the thermal image;

detect a corresponding object in a fourth position in the second image, the fourth position corresponding to the third position according to the mapping from the coordinates in the thermal image to the coordinates in the second image;

compare an appearance of the corresponding object to a contrast value of the candidate image area to determine if the corresponding object is an object equivalent to the first object; and in response to the appearance of the corresponding object differing from the appearance of the candidate image area by more than a second threshold amount, determine that the first object or the further object is a reflection in the thermal image, and compensate for the first object or the further object determined to be a reflection in the thermal image by determining that the further object is a source object of which the first object is a reflection, determining a reflection intensity gradient between a first pair of reference points of the first object, determining a source intensity gradient between a corresponding second pair of reference points of the source object, calculating a gradient ratio between the reflection intensity gradient and the source intensity gradient, and for each pixel within the first object, calculating a compensated intensity value by calculating a difference between a captured intensity value of the pixel and a multiplication of a captured intensity value of a corresponding pixel of the source object and the gradient ratio.

7. The system according to claim 6, further comprising a thermal camera and a visible light camera, a near infrared camera, or a short-wave infrared camera.

8. The system according to claim 6, wherein the circuitry is configured to compensate for the first object or the further object determined to be a reflection in the thermal image by interpolating between intensity values of pixels surrounding the first object.

9. The system according to claim 6, wherein the circuitry is configured to compensate for the first object or the further object determined to be a reflection in the thermal image by replacing captured intensity values of pixels within the first object with stored background intensity values for those pixels captured when no reflection was present.

10. A thermal camera comprising a thermal image sensor and a system according to claim 6.

11. A computer-implemented method of detecting and compensating for a reflection in a thermal image captured by a thermal image sensor, the method comprising:

capturing a second image by a visible light sensor, near infrared sensor, or short-wave infrared sensor having a field of view which overlaps a field of view of the thermal image;

determining a mapping from coordinates in the thermal image to coordinates in the second image;

detecting a first object in a first position in the thermal image;

analysing a candidate image area in a second position in the second image to determine if an object equivalent to the first object is present in the candidate image area, the second position corresponding to the first position according to the mapping from the coordinates in the thermal image to the coordinates in the second image; and in response to a determination that there is no equivalent object in the candidate image area, determining that the first object in the thermal image is a reflection, and detecting a source object in the thermal image of which the first object is a reflection;

determining a reflection intensity gradient between a first pair of reference points of the first object;

determining a source intensity gradient between a corresponding second pair of reference points of the source object;

calculating a gradient ratio between the reflection intensity gradient and the source intensity gradient; and for each pixel within the first object, calculating a compensated intensity value by calculating a difference between a captured intensity value of the pixel and a captured intensity value of a corresponding pixel of the source object multiplied by the gradient ratio to compensate for a reflection in the thermal image.

12. A non-transitory computer readable storage medium having stored thereon instructions for implementing the method according to claim 11, when executed on a device having processing capabilities.

* * * * *